United States Patent Office 2,951,859
Patented Sept. 6, 1960

2,951,859
PURIFYING AND STABILIZING ACIDS AND AMINES

Evald L. Skau, Robert R. Mod, and Frank C. Magne, New Orleans, La., assignors to the United States of America as represented by the Secretary of Agriculture No Drawing. Filed Aug. 14, 1958, Ser. No. 755,113

6 Claims. (Cl. 260—419)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention is a continuation-in-part of patent application Serial No. 424,791, filed April 21, 1954, now abandoned.

This invention relates to the purification of certain fatty acids containing homologs thereof as impurities.

In general, the process provided by this invention involves forming a homogeneous solution, preferably in a non-polar solvent, at a temperature not exceeding about 100° C. of substantially equimolar proportions of a fatty acid selected from the group consisting of saturated fatty acids having from 10 to 18 carbon atoms and the hydroxy derivatives thereof, such as capric, lauric, myristic, palmitic, stearic, and 12-hydroxystearic acids, said fatty acid containing from detectible traces up to about 40% of impurities comprising closely related higher melting and/or lower melting homologs thereof, particularly adjacent members of a naturally occurring homologous series of fatty acids, and an amine selected from the group consisting of n-amylamine, isomylamine, cyclohexylamine, benzylamine, 2-aminopyridine, and 2-amino-6-methyl pyridine, said amine being pure or containing from detectible traces up to about 40% of an impurity comprising a closely related higher melting and/or lowering melting homolog thereof. The formation of the homogeneous solution causes a reaction to occur in which the amino nitrogen atom of the said amine attaches to the carboxyl group of the said acid forming an acid-amine compound. The resulting homogeneous solution is then cooled to form crystals consisting essentially of the said acid-amine compound. The resulting crystals are isolated and then decomposed as, for example, by the use of a mineral acid, to obtain the organic acid and incidentally the said amine in substantially pure form.

The mixing of the fatty acid and the amine in a liquid single phase can be accomplished by fusing them together to form a single phase solution in which the substances themselves constitute mutual solvents. Preferably, the acid and the amine can be dissolved in an inert common solvent, or in a mixture of two or more solvents of such character that the final mixture can exist as a single liquid phase.

A further feature of the invention is that the liquid acids, such as capric acid, included with the aforementioned acids can be converted by the aforedescribed process to crystalline acid-amine compounds in which form the acids can be easily handled and manipulated as solid compositions prior to decomposition into the substantially pure acid.

As an incident to the aforedescribed process, the decomposition of the acid-amine compound concurrently produces the amine, as well as the acid, in substantially pure form.

As a further incident to the process, certain of the aforedescribed amines, such as n-amylamine, isoamylamine, benzylamine, 2-aminopyridine, and 2-amino-6-methylpyridine, which are ordinarily subject to degradation on storage, are stabilized against such degradation when in the form of the acid-amine compound.

Impure acids which can be employed comprise one acid mixed with a lesser amount (on a molar basis) of other related acids as impurities, as for example, one saturated acid mixed with a lesser amount of its higher melting and/or lower melting close homologs. The removal of such impurities by conventional purification procedures such as subjecting the acids to fractional recrystallization, fractional distillation, chromatographic adsorption, and the like requires unfeasible extensive retreatments and/or precision in the control of treating conditions. Furthermore, in numerous uses for such acids, even trace amounts of such impurities cannot be tolerated and must be removed.

It is recognized in the art that the removal even of the lower-melting, adjacent members of a naturally occurring homologous series of fatty acids or of their polar derivatives by process of fractional crystallization is extremely difficult, the more so if non-polar solvents are employed in the process. The difficulty results from the fact that fatty acids, particularly long chain fatty acids, associate and interassociate extensively to form double molecules when fused or in solution. Therefore crystallization results in mixed crystals containing more than one homolog in the same crystal lattice. The present invention provides a process for purifying long chain fatty acids containing closely related lower melting homologs, thereof as impurities by crystallization of acid-amine compounds from either polar or non-polar solvents. A predominant feature of this invention is that it provides a process for purifying long chain fatty acids even though some or all of the closely related homologs which are present as impurities have higher melting points and lower solubilities in the solvents being employed than the fatty acid to be isolated.

In the present process the acids being purified are converted to crystalline acid-amine compounds. The conversion is accomplished by a reaction which takes place when a homogeneous solution is made of the acid and the amine. The reaction involves the attachment of the nitrogen atom of the amine with the hydrogen atom of the carboxyl group. This attachment between acid and amine is through coordinate bonds which are relatively stable, i.e., which are generally stable at temperatures at least up to the melting point of the acid-amine compound. The reaction is carried out in a liquid solution containing the mixed acid and amine, i.e., in a mixture of the molten acid and amine, or preferably in a solution of the acid and amine in an amount of an inert organic solvent such as acetone or benzene in which acid-amine compound crystals will form at temperatures above the temperature of complete solidification of the solution. At the time the reaction takes place, the acids and amines and their impurities are all dissolved in a liquid solution. The crystalline acid-amine compounds when formed are well defined crystals which exhibit good filtration characteristics and entrain little, of any, of the liquid solutions in which they form.

The related compounds which are copresent with the acids, particularly adjacent members of a naturally occurring homologous series of fatty acids or of their polar derivatives, either do not form acid-amine compounds or form materially smaller amounts of such compounds. When the crystalline acid-amine compounds are isolated from the solutions, the acids and amines which have reacted to become components of the crystals are isolated from substantially all of their impurities. Any minor amounts of impurities which remain entrained in the crystals can be removed by recrystallization of the acid-amine compounds from inert solvents until their freezing points are the same as those for the pure acid-amine compound in question, or until their freezing points are no longer raised by additional recrystallizations. The pure crystalline acid-amine compounds isolated by the process of this invention can then be decomposed to obtain the purified acid and amine preferably by repeated extraction with aqueous mineral acid at a temperature above the melting point of the organic acid and of the acid-amine compound, cooling to allow the organic acid layer to solidify, and removing the organic acid mechanically or by filtration. The purified amines can be isolated subsequently from the mother liquor.

The acid-amine compounds prepared by the process of this invention can generally be stored for relatively long periods prior to subsequent decomposition into the purified acids and amines.

This invention is particularly useful in the preparation of pure starting materials, namely, the above described organic acids and amines, for employment in processes utilizing as a starting mixture such acids and amines and involving condensation of the acid and amine with elimination of water to produce N-substituted amides. When this invention is so used, the acids and the amines are purified by conversion into, and by recrystallization of, the acid-amine compounds as described hereinbefore. The resulting recrystallized acid-amine compounds free from impurities are then condensed to the amide, the conversion of the acid-amine compound into purified acid and amine and the condensation of the purified acid and amine into the amide occuring substantially simultaneously.

An advantageous feature of this invention is that many of the amines of limited stability are relatively stable while combined as components of the acid-amine compounds. For example, acid-amine compounds containing amines which are unstable or exhibit a rapid darkening, due to exposure to light and/or to reaction with or absorption of $O_2$ or $CO_2$ and/or water in the air, remain substantially unchanged and colorless for relatively long periods. The stabilizing effect of this process can be materially enhanced by selecting an acid which contains functional groups having a stabilizing effect upon the amine used.

Another advantageous feature of the present process is that it provides a method of converting liquid acids, and, incidentally, liquid amines, to solid compositions, thus rendering them easier to manipulate, e.g., to be handled in small amounts in the form of a powder, to be identified as being the same or different from other compounds by means of mixed melting points, and the like. In this method, a liquid acid and a liquid amine of the aforedescribed groups, and which form an acid-amine compound which is solid at room temperature, are utilized as the starting materials in the aforedescribed process forming the crystalline acid-amine compound which can thereafter be more readily manipulated as a solid composition and from which the liquid acid and incidentally liquid amine can be ultimately recovered in substantially pure form.

Substantially any impure saturated fatty acid of from about 10 to 18 carbon atoms having a relatively long open chain of carbon atoms and containing from detectable traces to about 40% of impurities comprising closely related higher melting and/or lower melting homologs can be used in the present process.

Illustrative examples of such acids include saturated fatty acids having 10 to 18 carbon atoms, such as capric, lauric, myristic, palmitic, stearic, docosanoic, the hydroxy derivatives thereof, such as 12-hydroxy stearic acid.

The present process is particularly advantageous in the treatment of fatty acids which are liquid at room temperature or slightly above, such as capric acid.

When any of the aforementioned amines are used in impure form in the process, they may contain from detectable traces up to about 40% of impurities comprising closely related higher melting and/or lower melting homologs.

The present process is particularly advantageous in the treatment of the aforesaid liquid fatty acids with amines which are liquid at room temperature or slightly above, such as n-amylamine and benzylamine.

Substantially any liquid organic compounds or mixtures thereof which are miscible with and chemically inert towards the acids and amines can be used as a solvent to facilitate the isolation of the crystalline acid-amine compound from the solution in which they are formed. Illustrative examples of suitable liquids include ketones such as acetone, methylethyl ketone, and the like; alcohols such as methyl, ethyl, isopropyl, and the like; esters such as methyl acetate, ethyl propionate, amyl acetate, and the like; ethers such as diethyl ether, dioxane, anisole, and the like; and hydrocarbons such as pentane, cyclohexane, bezene, and the like. Benzene, acetone, and mixtures thereof, are particularly suitable.

Where a solvent is used, for efficient operation, the amount of solvent should not be in any significant excess, since it is desirable that crystals of the acid-amine compound be caused to form expeditiously, as for example, by merely lowering the temperature. The range of suitable proportions varies depending on the different acids being isolated, different solvents, and the manner it is contemplated that crystallization will be caused. It is a simple procedure, however, to determine suitable proportions for any given acid or mixture by dissolving a small amount of the acid and the amine, in the proportions in which they are to be reacted, in the particular solvent to be used, using enough solvent at the desired operating temperature, causing crystallization to take place, and removing and testing the crystalline material to see if it is the desired compound.

The temperature used in forming the liquid single phase containing the long chain fatty acid and the amine is not critical. Any temperature above that at which the solution of the acid and the amine is undesirably viscous and below the decomposition temperature of the acid-amine compounds is operable. The temperature should not in any case exceed about 100° C. since at this point water may be driven off and the amide may form.

In the present process the amines and acids are mixed in proportions such that the first crystals yielded by a liquid solution, consisting essentially of the mixed acid and amine, are one or more acid-amine compounds of the acids and amines being purified free of unconverted acid and amine. When solutions consisting of molten mixtures of the acids and amines are cooled, the composition of the crystals formed depends both upon the relative proportion of acid and amine in the solution at the time the crystals form, and upon the individual acid and amine which is in the solution. With any given pair of acids or amines, solutions rich enough in acid first form crystals of uncombined acid or of uncombined acid mixed with acid-amine compounds; and solutions rich enough in amine first form crystals of uncombined amine or uncombined amine mixed with acid-amine compounds. The proportions in which the acids and amines are mixed in accordance with this invention lie between these acid-rich and amine-rich proportions. Equimolar portions can almost always be used. The maximum range of proportions which can be used in a given case can readily be determined by methods known to those skilled in the art—the liquid solutions consisting essentially of mixtures of the acid and amine constitute at least binary systems in which the solute molecules form compounds.

The preferred proportions in which to mix a given pair of acids and amines depend upon several factors: (1) the viscosity of the liquid solution at the temperatures at which the crystalline acid-amine compounds are to be isolated from the solution; (2) the amount of acid-amine compound crystals which can be allowed to form, as well as the temperature range involved, before crystals of uncombined acid or uncombined amine also begin to form; (3) where the acids and amines being purified form more than one acid-amine compound, the preferred proportions depend upon the relative proportion of combined acid and amine it is desired to have present in the acid-amine compound isolated.

Each of these factors depends upon the character of the individual acids and amines used. The tendency of a given liquid solution to become undesirably viscous at the temperature at which the crystals are to be isolated can be overcome by the employment of a non-viscous liquid mutual solvent.

The proportion in which a given acid and amine should be mixed so that the maximum amount of acid-amine compound crystals can be formed before uncombined acids or amines also crystallize can be determined by experiment or from the binary freezing point diagram for the acid and the amine used. The ratios of acid to amine in acid-rich or amine-rich proportions in which crystals of uncombined acids or amines, respectively, form along with crystals of acid-amine compounds are different for each particular binary system.

Some acids and amines form acid-amine compounds other than those in which one molecule of acid combines with one molecule of amine. For example, stearic acid and 2-aminopyridine form two acid-amine compounds, one in which one molecule of amine is combined with one molecule of acid, freezing point 64.8° C., and one in which one molecule of amine is combined with four molecules of acid, frezing point 57.3° C. Where such acids and amines are being used and where, for example, the amine is the most important product, it is preferred to mix approximately equimolar parts of the acid and the amine so that the crystals will be of the 1:1 compound. A slight excess of the amine is usually preferred. If on the other hand the acid is the more important product, it would usually be preferred to mix about four moles of acid and one mole or slightly more than one mole of amine so that the first crystals will have the composition: 4 moles of acid and 1 mole of amine. Compositions which lie between these limits can also be used effectively and may in some cases present advantages. In this range, crystals of either the 4:1 or the 1:1 compound form first and on extensive cooling crystals of both of these acid-amine compounds may eventually separate simultaneously in a eutectic mixture.

The acid-amine compounds can be decomposed into purified acids and amines which can be isolated by a variety of methods. The acid-amine compounds are at least partially dissociated in liquid form. The amines and acids can be separated by melting the acid-amine compound in the presence or absence of a solvent and subjecting the resulting liquid to selective adsorption or to extraction with a non-miscible selective solvent for either the acid or amine. They can also be separated by treating the acid-amine compound with a selective solvent for the acid, such as a basic liquid, and removing the amine by mechanical means and/or extraction with a selective solvent, such as an organic liquid immiscible with the basic liquid; by treating the acid-amine compound with a selective solvent for the amine such as an acidic liquid, and removing the organic acid; or by dissolving the acid-amine compound in a mutual solvent, such as acetone, insolubilizing the acid or amine, and removing the insoluble component. In general, treating the acid-amine compounds with an aqueous mineral acid in which the amine is soluble and removing the organic acid yielded by the acid-amine compound by mechanical means and/or extraction with a water-immiscible organic solvent for the acid is preferred.

The following examples are illustrative of the invention, the data and results thereof being listed in Table I hereinafter.

Substantially equimolar proportions of commercially available impure acids and amines, based on the weights of the predominant components, were heated together with the indicated solvent to form a homogeneous solution of the indicated concentration at the indicated temperature. The solutions were cooled to and allowed to stand at the indicated temperatures until a large crop of crystals of the acid-amine compound was formed. The crystals of the acid-amine compound were removed by filtration or centrifugation. The acid-amine compounds were recrystallized the indicated number of times in the indicated solvent and finally converted chemically to the pure acids and amines.

The chemical conversion was accomplished by repeated extraction of the acid-amine compound with aqueous hydrochloric acid at a temperature above the melting point of the acid and of the acid-amine compound, cooling to allow the organic acid layer to solidify, and mechanically removing the organic acid. The liquid amines were isolated from the mother liquor by adding sufficient solid sodium hydroxide or potassium hydroxide and separating the liquid amine phase. The solid amines were isolated from the mother liquor by adding a large excess of concentrated or solid sodium hydroxide or potassium hydroxide, salting out with sodium chloride, extracting with ether, and desolventizing. The acids were thoroughly dried in a vacuum desiccator over $P_2O_5$ and the solid amines in a vacuum desiccator over solid KOH. The liquid amines were dried with successive portions of solid KOH or NaOH, and finally distilled completely without fractionation. The freezing points above 0° C. were determined by the sealed tube method described in the publication by Magne and Skau, J. Am. Chem. Soc., vol 74, 2628–2630 (1952), and those below 0° C. were determined by cooling curves using the apparatus and technique described by Skau: Proc. Amer. Acad. Arts and Sci., vol. 67, pages 551–576 (1930). The freezing points of the original acids and amines listed in Table I were obtained on samples which were dried and prepared for the freezing point determination by the identical procedure used for the purified samples, respectively. In all cases the freezing point of the acid or amine isolated was higher than that of the original sample and closer to the accepted freezing point of the pure acid or amine, confirming the fact that the final product was purer,

Table I

| Example No. | Acid and Amine | (a) | (b) Percent | (c) °C. | (d) °C. | (e) | Fr. pt. of Acid, °C. Original | Fr. pt. of Acid, °C. After purification | Fr. pt. of Amine, °C. Original | Fr. pt. of Amine, °C. After purification |
|---|---|---|---|---|---|---|---|---|---|---|
| 1 | Crude Palmitic acid [1]: 2-Aminopyridine | B | 75 | 56 | 27 | 3 | 54.3 | 61.8 | | |
| 2 | Crude Stearic Acid [2]: 2-Aminopyridine | B | 55 | 60 | 27 | 3 | 66.8 | 69.3 | | |
| 3 | Palmitic Acid: n-Amylamine | A | 65 | 56 | 3 | 3 | | | −55.0 | −54.2 |
| 4 | Palmitic Acid: 95 pts. 2-Aminopyridine, 5 pts. 2-Amino-6-methyl pyridine | A | 75 | 55 | 27 | 1 | | | 55.7 | 57.7 |
| 5 | Palmitic Acid: 95.6 pts. n-Amylamine, 4.4 pts. Isoamylamine | A | 65 | 55 | 3 | 4 | | | −56.9 | −54.37 |
| 6 | Palmitic Acid: Isoamylamine | B | 85 | 58 | 3 | 4 | | | −94.4 | −92.1 |
| 7 | Capric acid [3]: Cyclohexylamine | B | 65 | 62 | 27 | 2 | 30.34 | 31.34 | −20.4 | −19.4 |
| 8 | 12-hydroxystearic Acid [4]: Benzylamine | L A | 65 | 56 | 27 | 1 | | | | |
| | | L B | 50 | 60 | 27 | 3 | 76.95 | 79.7 | | |
| 9 | Crude Stearic Acid [2]: Cyclohexylamine | B | 60 | 75 | 27 | 2 | 66.8 | 68.56 | | |
| 10 | Crude Myristic Acid: [5] Benzylamine | B | 25 | 50 | 27 | 2 | 49.9 | 52.6 | | |

(a) = Solvent: A = acetone; B = benzene.
(b) = Weight percent solute in solution being recrystallized.
(c) = Approximate temperature used to obtain homogeneous solution.
(d) = Chilling and filtration temperature.
(e) = Number of times recrystallized, including initial crystallization.
[1] Approximate composition: 90% palmitic acid, 6% stearic acid, and 4% oleic acid (Armour & Co. Neofat 1-56).
[2] Approximate composition: 6% palmitic acid, 90% stearic acid, and 4% oleic acid (Armour & Co. Neofat 1-65).
[3] Contains a few percent of caprylic and lauric acids as impurities.
[4] Approximate composition: about 15% of impurities, mainly stearic acid (Emery Industries —Hyfac 442).
[5] Approximate composition: 4% lauric acid, 90% myristic acid, 4% palmitic acid, and 2% oleic acid (Armour & Co. Neofat 13).

Examples of acid-amine compounds which have freezing points higher than the freezing points of the acid and/or the amine are the compounds formed between palmitic acid and the following amines (the freezing point of the acid-amine compound being given in parentheses in each instance): 2 - amino - 6-methylpyridine (65.3° C.); benzylamine (69.8° C.); n-amylamine (37.2° C.); isoamylamine (51.6° C.); cyclohexylamine (88° C.); and the compounds between cyclohexylamine and the following acids: stearic acid (93.5° C.); and capric acid (80.3° C.; and between 12-hydroxystearic acid and benzylamine (78.3° C.).

The following examples illustrate the use of the process of this invention to convert relatively unstable amines to relatively stable compounds from which the amine can be obtained after a relatively long period of storage in a state of greater purity than it was in prior to the treatment.

A few crystals of pure 2-amino-6-methylpyridine were exposed to the atmosphere and within 2 minutes had become liquid because of their absorption of moisture and perhaps carbon dioxide. When 1.4564 grams of crystals of the equimolecular compound between this aminopyridine and palmitic acid were similarly exposed to the atmosphere for 5 days, they showed no appreciable change in weight (actually a loss of 0.006 gram) indicating that they had absorbed no moisture or carbon dioxide.

Pure cyclohexylamine turned brown on standing in a stoppered bottle and when a few drops of the liquid were placed on a watch glass the absorption of carbon dioxide from the atmosphere was so rapid that the liquid quickly transformed to a white solid. Crystals of the equimolecular compound between capric acid and cyclohexylamine showed no change in weight on exposure to the atmosphere on a watch glass for 5 days. White crystals of the equimolecular compound between palmitic acid and cyclohexylamine showed no change in color appearance after two years in a stoppered bottle.

We claim:

1. A process comprising forming a homogeneous solution at a temperature not exceeding about 100° C. of substantially equimolar proportions of a fatty acid selected from the group consisting of saturated fatty acids having from 10 to 18 carbon atoms and the hydroxy derivatives thereof, said fatty acid containing from detectable traces up to about 40% of impurities comprising closely related homologs thereof, and an amine selected from the group consisting of n-amylamine, isoamylamine, cyclohexylamine, benzylamine, 2-aminopyridine, and 2-amino-6-methylpyridine, causing thereby a reaction to occur in which the amino nitrogen atom of the said amine attaches to the carboxyl group of the said acid forming an acid-amine compound: cooling the resulting homogeneous solution to form crystals consisting essentially of said acid-amine compound; isolating said crystals; and decomposing said crystals to obtain the said fatty acid in substantially pure form.

2. The process of claim 1 wherein the acid is palmitic acid and the amine is isoamylamine.

3. The process of claim 1 wherein the acid is 12-hydroxystearic acid and the amine is benzylamine.

4. The process of claim 1 wherein the acid is capric acid and the amine is cyclohexylamine.

5. The process of claim 1 wherein the acid and amine are both liquids and where the acid-amine compound is a solid.

6. A process comprising mixing substantially equimolar proportions of a fatty acid selected from the group consisting of saturated fatty acids having from 10 to 18 carbon atoms and the hydroxy derivatives thereof, said fatty acid containing from detectable traces up to about 40% of impurities comprising closely related homologs thereof, and an amine selected from the group consisting of n-amylamine, isoamylamine, cyclohexylamine, benzylamine, 2 - aminopyridine, 2 - amino-6-methylpyridine; forming a homogeneous solution of the mixed fatty acid and amine in a non-polar solvent at a temperature not exceeding about 100° C. causing thereby a reaction to occur in which the amino nitrogen atom of the said amine attaches to the carboxyl group of the said acid forming an acid-amine compound; cooling the resulting homogeneous solution to form crystals consisting essentially of said acid-amine compound; isolating said crystals; and decomposing said crystals to obtain the said fatty acid in substantially pure form.

References Cited in the file of this patent
UNITED STATES PATENTS

| | | |
|---|---|---|
| 2,042,729 | Ralston | June 2, 1936 |
| 2,276,508 | Nabenhauer | Mar. 17, 1942 |
| 2,528,267 | Dearborn | Oct. 31, 1950 |
| 2,575,526 | Myers | Nov. 20, 1951 |
| 2,577,076 | Ensor | Dec. 4, 1951 |
| 2,727,928 | Menn | Dec. 20, 1955 |
| 2,791,596 | Magne et al. | May 7, 1957 |
| 2,816,903 | Skau | Dec. 17, 1957 |

OTHER REFERENCES

"Fatty Acids and Their Derivatives," Ralson, 1948, pp. 303–311.